United States Patent [19]

Araujo et al.

[11] 4,166,745
[45] Sep. 4, 1979

[54] REFRACTIVE INDEX-CORRECTED COPPER-CADMIUM HALIDE PHOTOCHROMIC GLASSES

[75] Inventors: Roger J. Araujo; Paul A. Tick, both of Corning, N.Y.

[73] Assignee: Corning Glass Works, Corning, N.Y.

[21] Appl. No.: 861,129

[22] Filed: Dec. 16, 1977

[51] Int. Cl.² ........................... C03C 3/08; C03C 3/26
[52] U.S. Cl. ................................. 106/47 Q; 65/30 E;
  65/33; 65/DIG. 2; 106/54; 106/DIG. 6;
  252/300; 428/218; 428/410
[58] Field of Search .................. 106/DIG. 6, 54, 47 Q

[56] References Cited

U.S. PATENT DOCUMENTS

| | | | |
|---|---|---|---|
| 3,954,485 | 5/1976 | Seward et al. ................. | 106/DIG. 6 |
| 3,957,499 | 5/1976 | DeMunn et al. .............. | 106/DIG. 6 |
| 4,036,624 | 7/1977 | Krohn et al. .................. | 106/DIG. 6 |
| 4,076,544 | 2/1978 | Kerko et al. .................. | 106/DIG. 6 |

*Primary Examiner*—Helen M. McCarthy
*Attorney, Agent, or Firm*—Kees van der Sterre; Clinton S. Janes, Jr.; Clarence R. Patty, Jr.

[57] ABSTRACT

Alkali boroaluminosilicate glass compositions providing refractive index-corrected copper-cadmium halide photochromic glasses of optical quality, particularly useful for making ophthalmic lenses, are described. Ion-exchange-strengthenable glasses exhibiting good chemical durability and a satisfactory liquidus-viscosity relationship in combination with good photochromic properties and the required refractive index are also provided.

4 Claims, No Drawings

REFRACTIVE INDEX-CORRECTED COPPER-CADMIUM HALIDE PHOTOCHROMIC GLASSES

BACKGROUND OF THE INVENTION

The present invention is in the field of photochromic glasses and relates to refractive index-corrected photochromic glasses useful in the manufacture of photochromic ophthalmic lenses.

Photochromic glasses comprising crystallites of a silver halide as the phototropic phase have been described by Armistead and Stookey in U.S. Pat. No. 3,208,860. Eppler and Stookey disclose, in U.S. Pat. No. 3,197,296, a family of refractive-index-corrected silver halide photochromic glasses suitable for use in ophthalmic lenses.

Silver-free photochromic glasses exhibiting phototropic behavior analogous to that of the silver halide photochromic glasses, but comprising copper-cadmium halides in the phototropic phase, are reported by Araujo in U.S. Pat. No. 3,325,299. Additional copper-cadmium halide photochromic glasses are disclosed in U.S. Pat. No. 3,954,485 to Seward and Tick, a patent dealing with the manufacture of silver-free polarizing photochromic glasses.

The above-described silver-free photochromic glasses, hereinafter referred to as copper-cadmium halide photochromic glasses, offer certain economic and functional advantages over silver halide photochromic glasses. Included among these advantages are a smaller batch cost, due to the elimination of silver, a reduced dependence of photochromic properties on glass temperature, and a more desirable relationship between the intensity of the incident light and the photochromic darkening induced thereby in the glass.

Glasses which are to be utilized as ophthalmic lens glasses must be refractive index-corrected, i.e., they must exhibit a refractive index ($n_D$) in the range of about 1.52–1.54, preferably about 1.523, in order to be compatible with presently-available ophthalmic lens grinding and testing equipment. It is also essential that the glass be of optical quality, i.e., low in haze and free of inclusions and the like.

In the case of photochromic glasses for ophthalmic use, photochromic performance which is at least approximately equivalent to present commercially-available photochromic ophthalmic lenses is also required. Important elements of photochromic performance include rapid photochromic darkening upon exposure to actinic radiation, rapid fading in the absence thereof, and the attainment of an adequate degree of darkening in ophthalmic thicknesses (about 2 mm) when exposed to sunlight.

Refractive index-corrected copper-cadmium halide photochromic glasses of optical quality would find ready application in the manufacture of photochromic ophthalmic lenses, provided that acceptable photochromic properties were exhibited thereby. However, prior art refractive index-corrected base glasses used in the silver halide photochromic system, i.e., the base glasses described in the aforementioned U.S. Pat. No. 3,197,296 to Eppler et al., do not generally provide a good base for copper-cadmium halide photochromic phases. Substitution of copper-cadmium halide for silver halide in these glasses typically results in a product exhibiting relatively poor photochromic performance.

It is a principal object of the present invention to provide refractive index-corrected glass compositions suitable for making copper-cadmium halide photochromic glass lenses of optical quality, and ophthalmic lenses provided therefrom, which exhibit excellent photochromic properties.

It is a further object of provide glass compositions of this type which can be easily melted and formed utilizing existing glass-working techniques, yet which provide ophthalmic products which can be chemically strengthened by known methods and which meet or exceed existing standards for chemical durability and weatherability.

Other objects and advantages of the invention will become apparent from the following description thereof.

SUMMARY OF THE INVENTION

A major obstacle to the development of useful refractive index-corrected copper-cadmium halide photochromic glasses resides in the fact some of the oxides most effective in raising the refractive index of the glass, e.g., PbO and ZnO, are not desirable in the copper-cadmium system, due to an apparent adverse affect on photochromic properties. We have established that other oxides may be used for this purpose, but the increased quantities thereof which are needed to adjust the refractive index of the glass ultimately limit the amount of silica which can be used, adversely affecting the resistance of the glass to weathering and acid attack.

The photochromic performance of a refractive-index-corrected copper-cadmium halide photochromic glass depends also upon the presence of a specified minimum quantity of $B_2O_3$. Yet glasses containing the required amount of this constituent, being limited as to silica content, exhibit a marked phase separation tendency such that a hazy product, rather than a product of optical quality, is produced following heat treatment to develop photochromic properties. This tendency can be mitigated somewhat by the addition of a specified quantity of $Al_2O_3$, but is futher aggravated by the alkali metal oxide constituents which must be used to satisfactorily melt the glass.

Notwithstanding the above difficulties, we have discovered an area of silicate glass composition wherein refractive index-corrected copper-cadmium halide photochromic glasses of optical quality and exhibiting satisfactory photochromic performance may be provided. This composition area includes glass having analyzed compositions consisting essentially, in weight percent, of about 40–60% $SiO_2$, 13–26% $B_2O_3$, 6–16% $Al_2O_3$, 3–15% total of alkali metal oxides selected from the group consisting of $Li_2O$, $Na_2O$ and $K_2O$, 8–20% total of refractive index-correcting oxides selected from the group consisting of MgO, CaO, BaO, SrO, $TiO_2$, $ZrO_2$, $WO_3$, $MoO_3$, $Nb_2O_5$, $La_2O_3$ and $Ta_2O_5$, 0.1–0.5% CuO, 0.3–1.5% CdO, 0.3–0.9% Cl, 0–0.6% SnO, and 0–2% F.

Glass compositions within the above-described composition area can be melted and formed to provide glass products of optical quality which exhibit a refractive index in the range of about 1.52–1.54, preferably about 1.523, and which can be heat treated in accordance with conventional procedures to develop good photochromic properties therein without developing excessive haze. These glasses are routinely heat-treatable to provide photochromic properties which include, in 2 mm. thickness, a transmittance not exceeding about 55% in the fully darkened state and a fading rate providing fading of at least about 12 percentage points of transmittance in a five-minute fading interval from the fully darkened state.

Additional properties which are highly desirable in a photochromic glass to be used for ophthalmic lenses are excellent chemical durability and the capability of being chemically strengthened to high strength levels. The abovedescribed glasses are generally ion-exchange strengthenable by contact with molten $Na^+$ or $K^+$ salts, but good strengthenability by conventional $Na^+$-for-$Li^+$ ion exchange processing is of substantial commercial importance. The inclusion of $Li_2O$ in the glass as an essential constituent permits strengthening by presently used sodium-for-lithium ion-exchange processes; however, such additions must be limited since $Li_2O$ tends to reduce the chemical durability of the glass.

The melting and forming characteristics of a glass are additional elements affecting its suitability for ophthalmic use. Present commercial melting and forming processes for ophthalmic ware require the use of a glass composition exhibiting a viscosity of at least about 3000 poises at the composition liquidus temperature. Yet some of the oxides otherwise suitable for raising the refractive index of the glass also increase the liquidus temperature thereof, a factor which increases the tendency toward glass devitrification during forming.

Within the above-described composition range for refractive index-corrected copper-cadmium halide photochromic glasses, we have discovered a narrow range of glass composition which provides not only the required refractive index, optical clarity and photochromic response necessary for ophthalmic use, but also good chemical durability, a liquidus-viscosity relationship satisfactory for conventional forming processes, and excellent ion-exchange strengthening characteristics. Compositions exhibiting these combined properties include those consisting essentially, in weight percent by analysis, of about 45–56% $SiO_2$, 14.5–21% $B_2O_3$, 9.0–15% $Al_2O_3$, 1.4–2.4% $Li_2O$, 2–12% $Na_2O$, 0.–6.0% MgO, 0–3.5% BaO, 0.–2.5% $TiO_2$, 0–1.4% $ZrO_2$, 0–1.5% $La_2O_3$, at least 8% total of $MgO+BaO+TiO_2+ZrO_2+La_2O_3$, 0.1–0.5% CuO, 0.3–1.5% CdO, 0.3–0.9% Cl, 0–0.6% SnO and 0–2% F.

Compositions within the above-described range exhibit satisfactory forming behavior, having a viscosity at the liquidus of at least about 3000 poises. They also provide glass products which are low in haze and which exhibit a refractive index ($n_D$) in the 1.52–1.54 range (e.g., 1.523). These products typically possess excellent chemical durability, characterized by freedom from visible surface attack following a 10-minute exposure to 10% (wt.) HCl at 25° C., and are heat-treatable to provide photochromic properties including, in 2 mm. thickness, a transmittance not exceeding about 55% in the fully darkened state and fading of at least about 12 percentage points of transmittance in a 5-minute fading interval from the fully darkened state.

Finally the products are chemically strengthenable by known sodium-for-lithium ion exchange processes to provide unabraded modulus of rupture strengths of at least about 35,000 psi, with an ion-exchange layer depth of at least about 3 mils as determined by conventional stress layer examination techniques utilizing, for example, a polarizing microscope with a Babinet compensator. These strength and compression layer characteristics, which are readily obtainable by sodium-for-lithium salt bath ion-exchange processes at normal ion-exchange temperatures (300°–450° C.), permit ophthalmic lenses of 2 mm. thickness to routinely pass standard ball drop impact tests.

DETAILED DESCRIPTION

Glasses within the above-described composition ranges may be melted in conventional glass melting units such as pots, tanks, crucibles or the like utilizing ordinary glass batch constituents, including oxides or other compounds which are thermally decomposable to yield a melt of the selected composition at the temperatures customarily employed for melting borosilicate glasses. The melts may be formed into glass articles by drawing, rolling, blowing, pressing or other conventional techniques.

Of course, minor quantities of other conventional glass ingredients may be included in the compositions hereinabove described, provided that the essential properties of the compositions are not unduly affected thereby. For example, common glass colorants such as $Cr_2O_3$ and the like may be utilized to modify the color of the glass and/or to generally reduce the optical transmittance thereof, if desired. Similarly, FeO and SnO may be useful in minor quantities as low-temperature reducing agents, and FeO is particularly useful as an additive to modify the infrared absorption characteristics of the glass in the known manner. Fining agents and other low-temperature reducing agents may also be employed to improve the melting, heat treating, and photo-chromic characteristics of the glass.

Particular examples of glass compositions within the scope of the invention are set forth in Table I below. Compositions are reported in parts by weight on the oxide basis, except for the halogens which are reported on an elemental basis in accordance with prior reporting practice.

TABLE I

| | 1 | 2 | 3 | 4 | 5 | 6 | 7 | 8 |
|---|---|---|---|---|---|---|---|---|
| $SiO_2$ | 50.5 | 51.3 | 49.3 | 51.0 | 49.1 | 54.9 | 50.0 | 55.0 |
| $Al_2O_3$ | 10.2 | 10.2 | 10.1 | 10.4 | 13.3 | 9.3 | 10.5 | 8.5 |
| $B_2O_3$ | 19.6 | 20.6 | 19.6 | 20.2 | 20.3 | 17.9 | 20.6 | 16.5 |
| $Na_2O$ | 3.1 | 3.6 | 4.1 | 2.9 | 3.1 | 3.1 | 3.7 | 3.5 |
| $Li_2O$ | 1.8 | 1.4 | 1.8 | 1.9 | 2.5 | 1.8 | 2.6 | 1.5 |
| $K_2O$ | — | — | — | — | 0.5 | 0.5 | — | — |
| MgO | 5.1 | 5.1 | 6.1 | 6.4 | 3.5 | 4.1 | 6.1 | 4.0 |
| BaO | 2.9 | 2.9 | 2.9 | 2.9 | 2.2 | 2.2 | 2.2 | 3.5 |
| $TiO_2$ | 1.4 | 1.65 | 1.4 | 1.3 | 1.8 | 2.0 | 2.1 | 2.0 |
| $ZrO_2$ | 0.8 | 1.1 | 0.8 | 0.9 | — | 0.8 | 0.6 | 1.1 |
| $La_2O_3$ | 1.0 | 1.0 | 1.0 | 1.2 | 0.9 | 1.0 | — | 1.0 |
| CuO | 0.19 | 0.25 | 0.29 | 0.28 | 0.35 | 0.30 | 0.34 | 0.30 |
| CdO | 0.55 | 1.0 | 1.0 | 0.9 | 1.0 | 1.1 | 1.0 | 1.0 |
| Cl | 0.6 | 0.7 | 0.7 | 0.7 | 0.7 | 0.7 | 0.55 | 0.7 |
| F | 1.06 | 1.2 | 1.06 | 1.0 | 1.28 | 1.1 | 2.0 | 1.1 |
| SnO | 0.12 | 0.10 | 0.25 | 0.09 | 0.07 | 0.06 | 0.28 | 0.10 |
| $Cr_2O_3$ | — | — | 0.041 | — | — | — | — | 0.015 |

To prepare glass articles of the above compositions, glass batches may be compounded utilizing conventional glass batch constituents and the batches then melted in crucibles or optical glass melting units by heating to temperatures of about 1300° C. for a melting interval of about 3 hours. The resulting melts may then be cast into glass patties and placed in an annealer.

As is well known, certain of the photochromic constituents of photochromic glasses, particularly chlorine and cadmium, are subject to loss through volatilization during melting, so that compensation adjustments to batch composition must be made in order to reach a particular target composition. Such losses can range from about 10–70% for CdO and 30–60% for chlorine in the present compositions, depending on the particular melting conditions and type of melting unit employed. The compensating upward adjustments in batch concentration necessary to provide glass patties or other articles containing the levels of retained CdO and Cl shown in the above examples are readily determined for any particular melting procedure by routine experiment.

Conversion of glass patties of the above-described compositions to photochromic glass articles may be accomplished by exposing each patty to a heat treatment at temperatures between the glass strain and softening points. Thereafter, the glass patties are cut, ground, and polished to provide glass samples about 2 mm. in thickness from which the photochromic properties of the glass may readily be determined.

Typical heat treatments and resulting photochromic properties for each of the glasses reported above in Table I are reported below in Table II. Most of the heat treatments reported are two-stage heat treatments, for which two holding temperatures and holding times are reported. All of the photochromic glasses shown in the Table have refractive index values in the range of approximately 1.52–1.54.

The photochromic properties reported in Table II include the undarkened transmittance $T_o$, the darkened transmittance $T_{D20}$, and the faded transmittance $T_{F5}$ for each glass, as determined on samples of 2 mm. thickness. The darkened transmittance measurements are made on glass which has been darkened by a 20-minute exposure to two 15-watt black-light blue fluorescent lamps, this exposure being deemed sufficient to produce essentially complete darkening of the glass. The faded transmittance measurements are made on the same glass after a five-minute fading interval from the fully darkened state. Of course, photochromic properties such as reported in Table II vary depending upon heat treatment, so that different photochromic properties may be obtained by varying the time or temperature shown.

state during melting. This is best accomplished through the use of a glass reducing agent such as SnO; however, other glass reducing agents may be substituted for SnO, or increased glass melting temperatures can be employed alone or in combination with selected reducing agents, to achieve equivalent results.

Table III below sets forth some examples of glasses outside the preferred range of compositions above recited, which compositions exhibit low acid durability, marginal ion-exchange strengthenability, low refractive index, or excess haze, attributed in each case to variations in base glass composition outside the specified ranges. Compositions are reported in parts by weight on the oxide basis as calculated from the batch, except for the halogens which are reported on an elemental basis.

TABLE III

|  | A | B | C | D |
| --- | --- | --- | --- | --- |
| $SiO_2$ | 50.6 | 50.5 | 47.1 | 51.4 |
| $Al_2O_3$ | 10.2 | 10.2 | 10.3 | 10.4 |
| $B_2O_3$ | 19.2 | 20.0 | 19.7 | 20.6 |
| $Na_2O$ | 3.0 | 3.7 | 8.0 | 3.6 |
| $Li_2O$ | 2.3 | 1.36 | 1.0 | 1.4 |
| MgO | 6.3 | 5.0 | 4.3 | 3.0 |
| BaO | 3.4 | 2.4 | — | 3.0 |
| $TiO_2$ | 1.8 | 1.7 | 2.1 | 1.8 |
| $ZrO_2$ | 0.6 | 1.5 | 0.9 | 1.1 |
| $La_2O_3$ | — | 1.0 | — | 1.0 |
| CuO | 0.34 | 0.3 | 0.36 | 0.25 |
| CdO | 2.0 | 2.1 | 2.1 | 2.0 |
| Cl | 1.7 | 1.7 | 2.6 | 1.7 |
| F | 0.9 | 1.25 | 1.2 | 1.2 |
| SnO | 0.16 | 0.25 | 0.3 | — |
| PbO | — | — | — | 2.0 |
| Glass Properties | Low acid durability | Low ion-exchange strengthenability | Low Refractive Index and Strengthenability | Excess Haze |

As previously noted, it may be desirable to include

TABLE II

| Glass No. | 1 | 2 | 3 | 4 | 5 | 6 | 7 | 8 |
| --- | --- | --- | --- | --- | --- | --- | --- | --- |
| Heat Treatment (°C. - min.) | 530°-30 600°-30 | 530°-30 620°-30 | 530°-30 640°-15 | 530°-30 600°-30 | 620°-30 | 530°-30 620°-30 | 540°-30 600°-30 | 620°-20 |
| $T_o$ | 88.9 | 88.0 | 77.9 | 91.6 | 87.1 | 88.9 | 89.7 | 83.6 |
| $T_{D20}$ | 41.4 | 53.0 | 24.6 | 38.0 | 31.5 | 52.2 | 45.4 | 45.0 |
| $T_{F5}$ | 60.9 | 68.0 | 36.1 | 56.1 | 45.8 | 68.1 | 64.5 | 60.9 |

Where excellent chemical durability, good forming characteristics and a high degree of chemical strengthenability are required in a refractive index-corrected composition for ophthalmic use, it is found that the narrow composition limitations hereinabove defined for such glasses should be carefully observed. The chemical durability of the product is adversely affected if more than the specified quantities of $B_2O_3$, MgO, $Li_2O$ or BaO are used, or if insufficient $SiO_2$ or $Na_2O$ are present. The liquidus temperature of the glass is undesirably increased by excess amounts of $SiO_2$, MgO or $ZrO_2$, whereas chemical strengthenability by conventional $Na^+$-for-$Li^+$ processing falls below the required levels if insufficient $Li_2O$ is present. Excess quantities of $Na_2O$ or F provide a glass which tends to become hazy during the photochromic development heat treatment, while reductions in $B_2O_3$ or the photochromic constituents CuO, CdO and Cl below the required levels provide a glass with poor photochromic properties.

It is found that photochromic performance is improved if the glass is maintained in a slightly reduced minor amounts of glass colorants in refractive index-corrected photochromic glasses to modify glass color and/or to reduce the undarkened transmittance thereof. One of the most effective additives for this purpose is $Cr_2O_3$, and for applications requiring tinted lenses such as, for example, prescription sunglasses, glass compositions including $Cr_2O_3$ in an amount ranging up to about 0.3% by weight are particularly preferred. Similarly, for purpose of providing heat absorbing glasses, compositions containing FeO in an amount ranging up to about 0.20% by weight are employed.

Of course, it is evident from the foregoing description that numerous modifications and variations in the compositions and procedures hereinabove set forth may be carried out within the scope of the invention as defined by the appended claims.

We claim:
1. A refractive index-corrected copper-cadmium halide photochromic glass having a composition, in weight percent, of about 45–56% $SiO_2$, 14.5–21% $B_2O_3$,

9.0–15% $Al_2O_3$, 1.4–2.4% $Li_2O$, 2–12% $Na_2O$, 0–6.0% MgO, 0–3.5% BaO, 0–2.5% $TiO_2$, 0–1.4% $ZrO_2$, 0–1.5% $La_2O_3$, at least 8% total of refractive index-correcting oxides $MgO+BaO+TiO_2+ZrO_2+La_2O_3$, 0.1–0.5% CuO, 0.3–1.5% CdO, 0.3–0.9% Cl, 0–0.6% SnO, and 0–2% F, said glass having:
(a) a refractive index ($n_D$) in the range of about 1.52–1.54;
(b) chemical durability characterized by freedom from visible surface attack following a 10-minute exposure to 10% (wt.) HCl at 25° C.;
(c) a viscosity of at least 3000 poises at the liquidus temperature thereof;
(d) photochromic properties which provide, in 2 mm. thickness, a transmittance not exceeding about 55% in the fully darkened state and fading of at least 12 percentage points of transmittance in a 5-minute fading interval from the fully darkened state;

said glass being chemically strengthenable by sodium-for-lithium ion-exchange to provide a modulus of rupture strength of at least about 35,000 psi with an ion-exchange layer depth of at least about 3 mils, and (l) being essentially free of Ag, PbO and ZnO.

2. A photochromic glass in accordance with claim 1 which additionally contains $Cr_2O_3$ in an amount ranging up to about 0.3% by weight.

3. A photochromic glass in accordance with claim 1 which additionally contains FeO in an amount ranging up to about 0.20% by weight.

4. A photochromic glass in accordance with claim 1 which has a refractive index ($n_D$) of about 1.523.

* * * * *

UNITED STATES PATENT AND TRADEMARK OFFICE
CERTIFICATE OF CORRECTION

PATENT NO. : 4,166,745
DATED : September 4, 1979
INVENTOR(S) : Roger J. Araujo and Paul A. Tick It is certified that error appears in the above–identified patent and that said Letters Patent are hereby corrected as shown below:

Column 3, line 8, place a hyphen between "above" and "described".

Column 3, line 40, change "0.-6.0%" to --0-6.0%.

Column 3, line 41, change "0.-2.5%" to --0-2.5%--.

Column 4, line 30, change "photo-chromic" to --photochromic--.

Column 7, line 5, change "Cuo" to --CuO--.

Signed and Sealed this

Fifth Day of February 1980

[SEAL]

Attest:

SIDNEY A. DIAMOND

Attesting Officer

Commissioner of Patents and Trademarks